United States Patent
Guven et al.

(10) Patent No.: US 10,547,507 B2
(45) Date of Patent: *Jan. 28, 2020

(54) AUTOMATED CHANGE MONITORING AND IMPROVEMENT RECOMMENDATION SYSTEM FOR INCIDENT REDUCTION IN INFORMATION TECHNOLOGY INFRASTRUCTURE

(71) Applicant: International Business Machines Corporation, Armonk, NY (US)

(72) Inventors: Sinem Guven, New York, NY (US); Karin Murthy, Elmsford, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,458

(22) Filed: Apr. 26, 2018

(65) Prior Publication Data

US 2018/0248754 A1 Aug. 30, 2018

Related U.S. Application Data

(63) Continuation of application No. 14/978,710, filed on Dec. 22, 2015, now Pat. No. 10,044,563.

(51) Int. Cl.
*H04L 12/24* (2006.01)
*G06N 7/00* (2006.01)
(Continued)

(52) U.S. Cl.
CPC ...... *H04L 41/0813* (2013.01); *G06F 16/2246* (2019.01); *G06F 16/24578* (2019.01);
(Continued)

(58) Field of Classification Search
CPC ............. H04L 41/0803; H04L 41/0816; H04L 41/5074; H04L 43/08; G06F 17/30327;
(Continued)

(56) References Cited

U.S. PATENT DOCUMENTS

| 7,246,229 | B2 * | 7/2007 | Suermondt | ............ | G06Q 50/22 713/100 |
| 7,987,146 | B2 | 7/2011 | Shwartz et al. | | |

(Continued)

OTHER PUBLICATIONS

A. Medem et al., "TroubleMiner: Mining Network Trouble Tickets," IFIP/IEEE International Symposium on Integrated Network Management-Workshops (IM), Jun. 2009, pp. 113-119.
(Continued)

*Primary Examiner* — Nam T Tran
(74) *Attorney, Agent, or Firm* — Kristofer Haggerty; Ryan, Mason & Lewis, LLP

(57) ABSTRACT

A method includes obtaining, from a service management database, one or more change tickets and one or more incident tickets relating to an information technology infrastructure, defining one or more change-incident pairs based on linkages between the incident tickets and the change tickets, identifying, from the change-incident pairs, one or more dimensions affecting outcomes of implementation of one or more change types, generating at least one recommendation for altering implementation of subsequent changes of a given change type to the information technology infrastructure based on the identified dimensions, applying the at least one recommendation to the implementation of one or more subsequent changes of the given change type to configuration items in the information technology infrastructure, monitoring the information technology infrastructure to determine outcomes of the subsequent changes of the given change type, and modifying the at least one recommendation responsive to the monitoring.

20 Claims, 16 Drawing Sheets

(51) Int. Cl.
    *G06N 20/00*     (2019.01)
    *G06F 16/22*     (2019.01)
    *G06F 16/2457*   (2019.01)
    *H04L 12/26*     (2006.01)
    *G06F 16/21*     (2019.01)
(52) U.S. Cl.
    CPC ............. *G06N 7/005* (2013.01); *G06N 20/00* (2019.01); *H04L 41/5074* (2013.01); *H04L 43/08* (2013.01)
(58) Field of Classification Search
    CPC ... G06F 17/3053; G06N 99/005; G06N 7/005
    See application file for complete search history.

(56)  References Cited

U.S. PATENT DOCUMENTS

| | | | |
|---|---|---|---|
| 8,271,402 B2 | 9/2012 | Fisher, Jr. | |
| 8,301,613 B2 | 10/2012 | Grabarnik et al. | |
| 8,365,019 B2 | 1/2013 | Sailer et al. | |
| 8,799,436 B2 | 8/2014 | Ayachitula et al. | |
| 8,935,153 B2 | 1/2015 | McKeeman et al. | |
| 2005/0097396 A1 | 5/2005 | Wood | |
| 2007/0022000 A1 | 1/2007 | Bodart et al. | |
| 2007/0100712 A1 | 5/2007 | Kilpatrick et al. | |
| 2008/0172574 A1 | 7/2008 | Fisher | |
| 2009/0063387 A1 | 3/2009 | Beaty et al. | |
| 2010/0131315 A1* | 5/2010 | Gilbert ................ | G06Q 10/10 705/7.38 |
| 2010/0179927 A1* | 7/2010 | Meher ................ | G06Q 30/02 706/11 |
| 2013/0262082 A1 | 10/2013 | McKeeman et al. | |
| 2017/0212756 A1 | 7/2017 | Ryali et al. | |
| 2018/0032330 A9 | 2/2018 | Ryali et al. | |

OTHER PUBLICATIONS

L. Tang et al., "Identifying Missed Monitoring Alerts Based on Unstructured Incident Tickets," 9th International Conference on Network and Service Management (CNSM), Oct. 2013, pp. 143-146, Zurich, Germany.
I. Rish et al., "Adaptive Diagnosis in Distributed Systems," IEEE Transactions on Neural Networks, Sep. 2005, pp. 1088-1109, vol. 16, No. 5.
L. Shwartz et al., "Quality of IT Service Delivery—Analysis and Framework for Human Error Prevention," IEEE International Conference on Service-Oriented Computing and Applications (SOCA), Dec. 2010, pp. 1-8.
D. Scott, "Best Practices for Continuous Application Availability," Gartner IT Security Summit 2005, Jun. 2005, 21 pages.
J. Druebert, "Changes, Incidents & Uninteded Consequences," ITSM Watch, http://www.itsmwatch.com/itil/article.php/3866396/Changes-Incidents—Unintended-Consequences.htm, Feb. 22, 2010, 3 pages.
L. Tang et al., "Recommending Resolutions for Problems Identified by Monitoring," IFIP/IEEE International Symposium on Integrated Network Management (IM 2013), May 2013, 9 pages.
J. Bogojeska et al., "Classifying Server Behavior and Predicting Impact of Modernization Actions," 9th International Conference on Network and Service Management (CNSM), Oct. 2013, pp. 59-66.
S. Agarwal et al., "SmartDispatch: Enabling Efficient Ticket Dispatch in an IT Service Environment," Proceedings of the 18th ACM SIGKDD International Conference on Knowledge Discovery and Data Mining, Aug. 2012, pp. 1393-1401.
L. Tang et al., Optimizing System Monitoring Configurations for Non-Actionable Alerts, IEEE Network Operations and Management Symposium (NOMS), Apr. 2012, 9 pages.
The Stanford Natural Language Processing Group, "The Standford Parser: A Statistical Parser," http://nlp.stanford.edu/software/lex-parser.shtml, 2015, 6 pages.
R. Gupta et al., "Automating ITSM Incident Management Process," IEEE International Conference on Autonomic Computing (ICAC), Jun. 1008, pp. 141-150.
S. Guven et al., "Change Risk Expert: Leveraging Advanced Classification and Risk Management Techniques for Systematic Change Failure Reduction," IEEE Network Operations and Management Symposium (NOMS), Apr. 2012, pp. 795-809, Maui, Hawaii.
S. Hagen et al., "Efficient Verification of IT Change Operations or: How We Could Have Prevented Amazon's Cloud Outage," IEEE Network Operations Management Symposium (NOMS), Apr. 2012, pp. 368-376, Maui, Hawaii.
J.W. Branch et al., "BizMap: A Framework for Mapping Business Applications to IT Infrastructure," IFIP/IEEE International Symposium on Integrated Network Management (IM), May 2015, pp. 1377-1383, Ottawa, Ontario, Canada.
U.S. Appl. No. 14/979,095, filed in the name of Sinem Guven et al. Dec. 22, 2015 and entitled "Discovering Linkages Between Changes and Incidents in Information Technology Systems."
List of IBM Patents or Patent Applications Treated as Related.

* cited by examiner

200

300

400

500

600

700

800

900

1000

1100

1200

1300

1400

1500

1600

AUTOMATED CHANGE MONITORING AND IMPROVEMENT RECOMMENDATION SYSTEM FOR INCIDENT REDUCTION IN INFORMATION TECHNOLOGY INFRASTRUCTURE

BACKGROUND

The present invention relates to information technology, and more specifically, to techniques for managing changes to information technology infrastructure. Linking information technology service incident tickets to relevant information technology change tickets, or more generally linking incidents to changes, is a hard problem due to lack of documented historical change-incident pairs. However, even when it is possible to reliably link incidents to the changes that caused them, due to the complexity and high dimensionality of change and incident data, it is often difficult to discover and visualize complex trends and implicit relationships between the incident and change domains beyond simple summarizing statistics.

SUMMARY

Embodiments of the invention provide techniques for implementing changes to configuration items in information technology infrastructure.

For example, in one embodiment, a method comprises obtaining, from a service management database, one or more change tickets and one or more incident tickets relating to an information technology infrastructure, defining one or more change-incident pairs based on linkages between the incident tickets and the change tickets, identifying one or more dimensions affecting outcomes of implementation of one or more change types based on the change-incident pairs, generating at least one recommendation for altering implementation of subsequent changes of a given change type to the information technology infrastructure based on the identified dimensions, applying said at least one recommendation to the implementation of one or more subsequent changes of the given change type for configuration items in the information technology infrastructure, monitoring the information technology infrastructure to determine outcomes of the subsequent changes of the given change type, and modifying said at least one recommendation responsive to said monitoring, wherein the method is performed by at least one processing device coupled to the information technology infrastructure over at least one network.

DETAILED DESCRIPTION

Illustrative embodiments of the invention may be described herein in the context of illustrative methods, systems and devices for implementing changes to configuration items in information technology (IT) infrastructure. However, it is to be understood that embodiments of the invention are not limited to the illustrative methods, systems and devices but instead are more broadly applicable to other suitable methods, systems and devices.

As discussed above, linking incidents to changes is a complex task. For example, linking changes and incidents is typically a manual task prone to error and often neglected due to time constraints. In the IT service domain, changes to system configuration are responsible for a major portion of the incidents that result in client outages. However, it is typically very difficult to establish relationships between changes and incidents as proper documentation takes lower priority at change creation time as well as during incident management in order to deal with the tremendous time pressure to quickly implement changes and resolve incidents. As a result, it is often not possible to leverage historical data to perform retrospective analysis to identify any emerging trends linking changes to incidents, or to build predictive models for proactive incident prevention at change creation time.

Moreover, even in systems where the task of linking changes to incidents is achieved, due to the complexity and high dimensionality of change and incident data it is often difficult to discover and visualize complex trends and implicit relationships between the incident and change domains beyond simple summarizing statistics, e.g., X % of changes of a particular type lead to incidents. Manual examination of such data is even more difficult. As such, current systems do not adequately address the need for determining recommendations to help reduce or prevent future incidents.

Various embodiments of the invention address these and other issues with conventional change and incident management systems. For example, some embodiments provide for automated and dynamically updated recommendation mining and visualizations based on incident and change data to help reduce or prevent future incidents. Some embodiments further allow for implementing such recommendations and monitoring their effectiveness over time. High importance recommendations may be generated based on statistical analysis. In some instances, recommendations may focus on certain sub-areas of importance to explore data and trends while maintaining a big picture context of the analysis for easy comparison across the different sub-areas.

Figure 1:
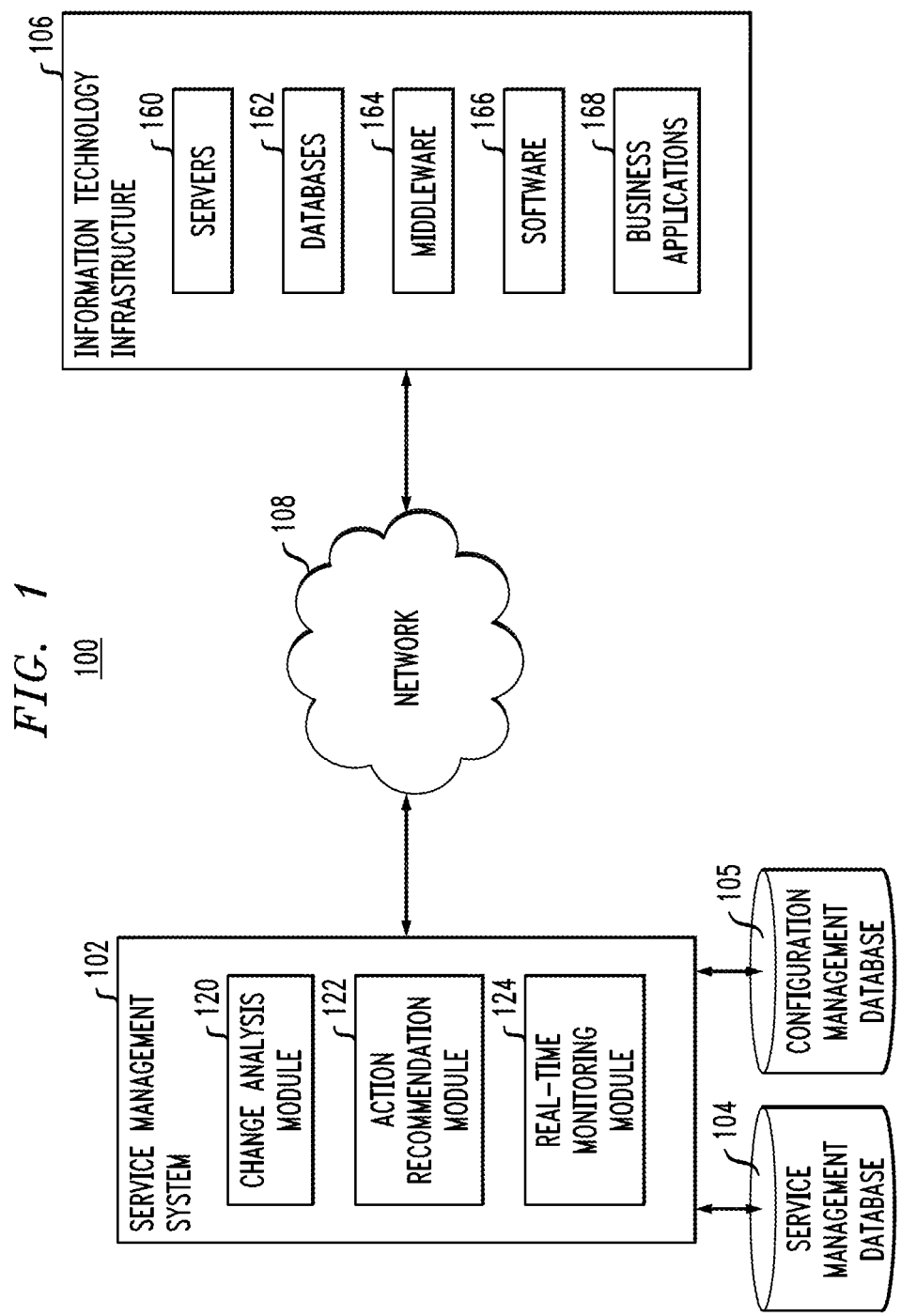
FIG. 1 depicts a system for implementing changes to configuration items in information technology infrastructure, according to an embodiment of the present invention.

FIG. 1 illustrates a network system 100 for implementing changes in IT infrastructure 106. The system 100 includes a service management system 102 coupled to a service management database (SMDB) 104. The service management system 102 is also coupled to IT infrastructure 106 over network 108. The network 108 may be any one of or combination of different network types. While FIG. 1 also shows the service management system 102 coupled to a separate configuration management database (CMDB) 105, embodiments are not limited to arrangements wherein the SMDB 104 and CMDB 105 are separate. In some embodiments, for example, the SMDB 104 may itself include the CMDB 105 or vice-versa. In addition, in some embodiments the service management system 102 is not necessarily coupled to both a SMDB 104 and a CMDB 105. One or both of the SMDB 104 and CMDB 105 may be implemented internal to the service management system 102 rather than external to the service management system 102.

The IT infrastructure 106 includes a number of servers 160, databases 162, middleware 164, software 166, business applications 168 and possibly other types of configuration items (CIs) not specifically shown.

The service management system 102 implements a change analysis module 120, action recommendation module 122 and real-time monitoring module 124. The change analysis module 120 is configured to utilize change and incident data from SMDB 104 to identify dimensions that affect the outcomes of different change types. The action recommendation module 122 utilizes the identified dimensions to generate recommendations for altering the implementation of changes of different change types to the IT infrastructure 106.

Real-time monitoring module 124 applies the recommendations from action recommendation module 122 to the implementation of changes to the IT infrastructure 106. The real-time monitoring module 124 also monitors IT infrastructure 106 to determine any change in outcomes for change types resulting from implementing the recommendations. The real-time monitoring module 124 can provide such information to the change analysis module 120 and/or the action recommendation module 122 so as to modify or dynamically update the recommendations for altering implementation of changes to the IT infrastructure 106.

In some embodiments, the change tickets or change data is represented as a problem space where each change corresponds to an instance. Each change or instance has an N-ary outcome. As an example, the N-ary outcome may be binary, e.g., a good outcome may represent a change that did not cause an incident while a bad outcome may represent a change that caused an incident. As another example, the N-ary outcome may be more than two levels or gradations, such as red for high risk, amber for medium risk, yellow for low risk, green for no risk, etc. Given the N-ary outcomes, a goal is to improve the percentage of instances or changes with positive outcomes.

In order to improve the percentages of instances with positive outcomes, a first step is to determine under what circumstances an outcome is positive or negative. In the context of change data, this may represent determining under what circumstances is a change or change type likely to result in an incident. The circumstances are a set of measurable or inferable attributes describing the instances and outcomes. Such attributes are also referred to herein as dimensions. After determining the circumstances under which outcomes are positive or negative, the next step is to recommend actions to increase the percentage of instances with positive outcomes. The system is monitored as the recommended actions are implemented, so as to determine the effectiveness of different recommendations. For example, when actions are taken on a specific recommendation, the delta attributable to the action is measured and used to determine whether the recommendation has altered the outcomes for instances or changes of a given type.

An example of a recommendation is provided below for purposes of illustration. The change analysis module 120 may analyze change tickets and incident tickets from SMDB 104 to identify change-incident pairs. Utilizing the change-incident pairs, the change analysis module 120 observes that whenever a Windows Server change is: created for the owner group I-INT-GR-WINTEL; of high priority; and scheduled on a weekend, there is a higher risk of this change type causing an incident.

In view of these observations, the action recommendation module 122 may generate various recommendations. For example, the action recommendation module 122 may recommend: (1) that personnel in the owner group I-INT-GR-WINTEL be trained on how to perform changes for Windows Servers; or (2) discourage or disallow changes on weekends.

The real-time monitoring module 124 applies recommendation (1) or (2) for subsequent changes to IT infrastructure 106, and monitors the results. If recommendation (1) is implemented, the real-time monitoring module 124 will check whether the percentage of changes with negative outcomes for the underlying observation has changed. If recommendation (2) is implemented, the real-time monitoring module 124 will check whether the outcomes for changes performed on a weekday has changed.

The action recommendation module 122 receives monitoring results from the real-time monitoring module 124, and modifies the generated recommendations accordingly. Consider, as an example, a scenario in which recommendation (2) was implemented and the percentage of negative outcomes for Windows Server changes created by Owner Group I-INT-GR-WINTEL of high priority performed on a weekday increases. Based on this, the action recommendation module 122 may conclude that recommendation (2) is ineffective for reducing negative outcomes for Windows Server changes created by Owner Group I-INT-GR-WINTEL of high priority. As such, the action recommendation module 122 may direct the real-time monitoring module 124 to implement recommendation (1) instead of recommendation (2) or to generate a new recommendation (3). While in this particular example only one recommendation is implemented for Windows Server changes created by Owner Group I-INT-GR-WINTEL of high priority, embodiments are not so limited. The action recommendation module 122 and real-time monitoring module 124 may implement multiple different recommendations for a single change type or multiple different change types simultaneously.

The action recommendation module 122 may choose actions to recommend based on mappings or other associations between actions and observed attributes. Several examples of associating actions with observed attributes are described below. It is to be appreciated, however, that embodiments are not limited solely to the specific action-attribute matchings below. For the attributes Owner Group and/or Change Type, the mapped or associated action may be to train. For the attributes of Time of Week or Time of Day, the mapped or associated action may be to move to a different day or move to a different time of day, respectively. For the attribute CI, the mapped or associated action may be to improve the CI. As mentioned above, these action-attribute matchings are presented by way of example only.

Various ones of the attributes mentioned above may be mapped to different or additional actions in other embodiments. Also, not all attributes need to be matched with an action. For the Priority attribute, as an example, there may be no mapped or associated action.

The action-attribute matchings may be utilized by the action recommendation module 122 to select a recommendation for a particular observation. The actions that apply to the attributes in the observation may be picked as the recommended action. Multiple attributes may be combined if the same action applies. Continuing with the above examples, the attributes of Owner Group and Change Type may be combined. If the recommended action reflects instances observed in the past, the action recommendation module 122 may further verify or check that the alternative is indeed better. As an example, if the action recommendation module 122 selects an action for altering implementation of a change from a weekend to a weekday, the action recommendation module 122 may check to ensure that changes implemented on a weekday improve outcomes relative to changes implemented on the weekend.

Figure 2:
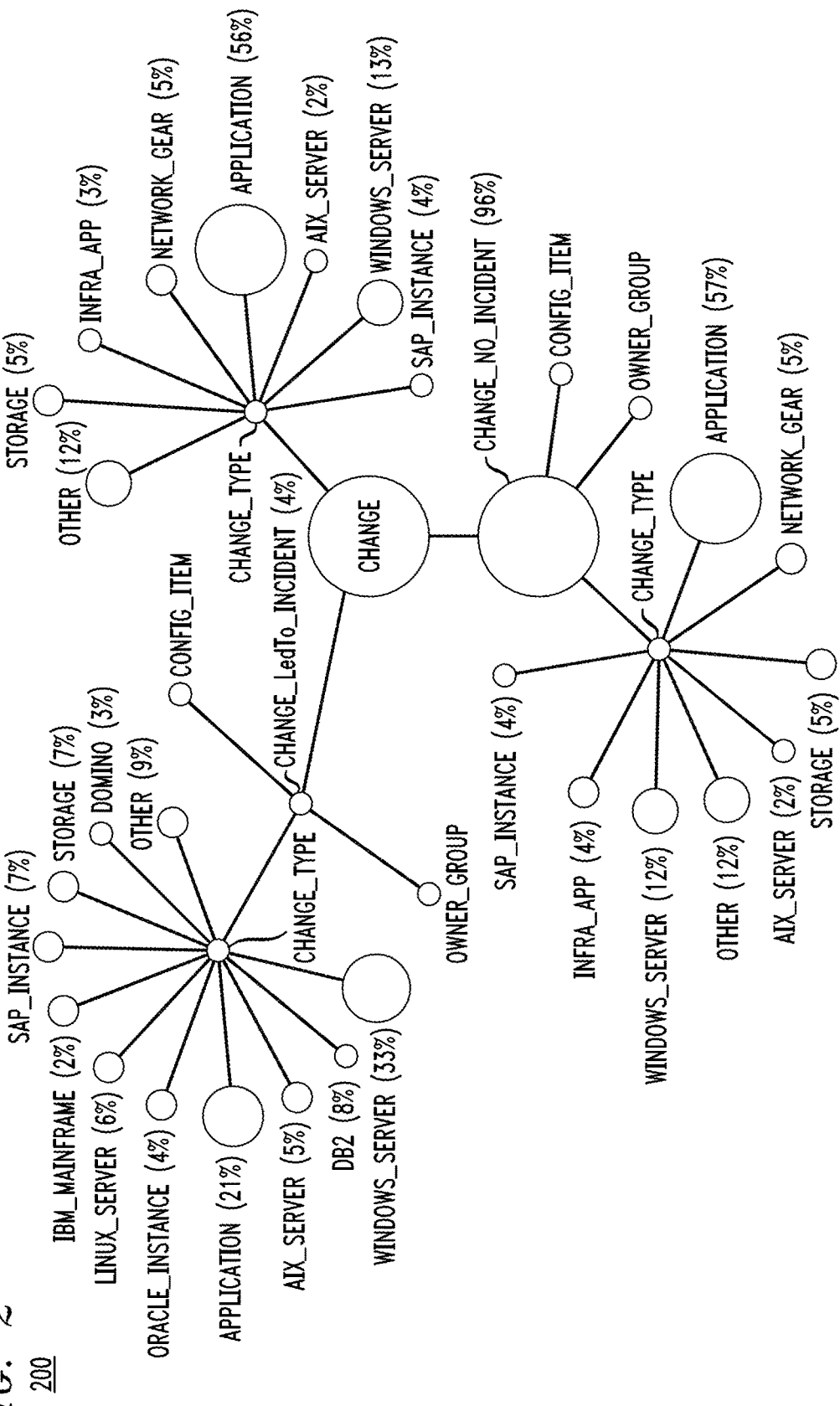
FIG. 2 depicts a graph representation of dimensions associated with historical changes to configuration items in information technology infrastructure, according to an embodiment of the present invention.

FIG. 2 depicts a probability tree 200, showing various dimensions or attributes for changes to CIs in IT infrastructure given a repository of historical changes. The probability tree 200 includes a root node "Change" from which two child nodes, "Change_No_Incident" and "Change_Led-To_Incident", branch out. The two branches for Change_No_Incident and Change_LedTo_Incident represent positive and negative outcomes, respectively. In other embodiments, however, the outcome need not be binary. Each change may be associated with an N-ary outcome, where N is greater than or equal to two. For example, in other embodiments the Change node may have three child nodes representing three different categories of outcomes, such as changes that did not lead to an incident, changes that led to a minor incident and changes that led to a major incident. Various other N-ary outcomes may be used in other embodiments.

In addition, the distinction between changes that led or did not lead to incidents is not the only measure of success or outcome which may be utilized. As an example, the time for implementing a change may be utilized for classifying outcomes. A change which takes more than a designated period of time to implement may be considered a negative outcome while changes taking less than the designated period of time to implement may be considered positive outcomes. This outcome space need not be binary. For example, multiple time thresholds may be used to classify changes as successful (e.g., changes that take less than a first designated period of time to implement), partially successful (e.g., changes that take less than a second designated period of time but more than the first designated period of time to implement) or unsuccessful (e.g., changes that take more than the second designated period of time to implement).

As another example, certain combinations of attributes may be utilized to classify changes in an N-ary outcome space. Consider the dimensions of time and priority. High priority changes may take longer to implement but still be considered positive outcomes. Thus, multiple time thresholds may be used for different priorities. Low priority changes may be considered positive or negative based on whether they were implemented within a first designated period of time, while high priority changes may be considered positive or negative based on whether they were implemented within a second designated period of time different than the first designated period of time. Again, the outcome need not be binary—multiple time and/or priority thresholds may be used to classify changes as successful, partially successful or unsuccessful, or more generally multiple dimension or attribute thresholds may be utilized to classify changes into an N-ary outcome space.

The relative sizes of the nodes in graph 200 indicate the proportion of historical changes with such attributes. Each node is also labeled with a percentage showing the proportion of historical changes with the given attribute or dimension. For example, the Change_No_Incident node represents 96% of the historical changes, while the Change_LedTo_Incident node represents 4% of the historical changes.

The root Change node also includes a branch leading to node "Change_Type" which further branches out into various change types including "SAP_Instance", "Windows_Server", "AIX_Server", "Application", "Network_Gear", "Infra_App", "Storage" and "Other". This portion of the probability tree 200 indicates the relative percentages of all changes falling under the different change types.

The probability tree 200 also has portions branching out from the Change_No_Incident and Change_LedTo_Incident nodes showing the relative percentages of such changes falling under different change types. Each of the Change_No_Incident and Change_LedTo_Incident nodes also includes branches for other dimensions such as "Owner_Group" and "Config_Item." Although not specifically shown in FIG. 2 for clarity, such nodes may also branch out further showing the relative percentages of changes having different owner groups, CIs, etc. Also, although not explicitly shown in FIG. 2 for clarity, the root node Change and child nodes Change_No_Incident and Change_LedTo_Incident may include branches for various other dimensions including but not limited to owner group, CI, time, priority, etc.

The probability tree 200 may be analyzed using various graph traversal algorithms, including depth-first search (DFS) and breadth-first search (BFS) techniques as well as other types of tree traversal techniques. For example, the probability tree 200 may be analyzed so as to identify the worst-performing change type for changes that led to incidents. In the FIG. 2 example, the worst-performing change type is Windows_Server at 33%. It is to be appreciated, however, that other types of changes may be the worst performing given other repositories or databases of historical changes.

The change analysis module 120 may provide information to the action recommendation module 122 regarding the worst-performing change type or types, so as to focus recommendations on those areas providing the greatest potential for improvement in overall raw numbers. Embodiments, however, need not select the worst-performing change type or types. Instead, the change analysis module 120 and/or action recommendation module 122 may select change types based on various combinations of attributes. A probability tree may be analyzed so as to select change types having particular priority levels, owner groups, time to implement, CI, etc. For example, if the probability tree indicates that a certain owner group is underperforming, recommendations may be made specific to the owner group rather than specific to a change type.

Figure 3:
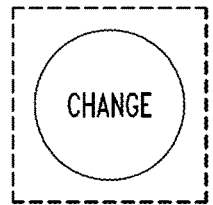
FIGS. 3-13 depict additional graph representations of dimensions associated with historical changes to configuration items in information technology infrastructure, according to embodiments of the present invention.
Figure 4:
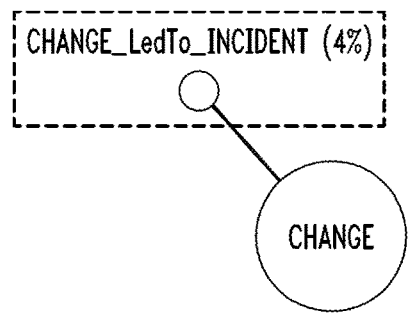

FIGS. 3-13 illustrate traversal of a probability tree by selection of consecutive nodes having the highest proportion of negative outcomes. For ease of illustration, the selected node in FIGS. 3-13 is shown surrounded by a dashed box. FIG. 3, for example, shows probability tree 300 with the root node "Change." FIG. 4 shows probability tree 400 selecting the node "Change_LedTo_Incident" as the node with the highest proportion of negative outcomes.

Figure 5:
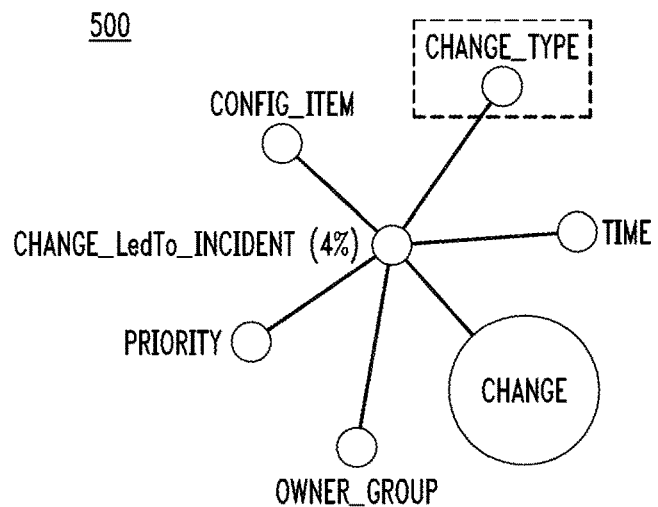
Figure 6:
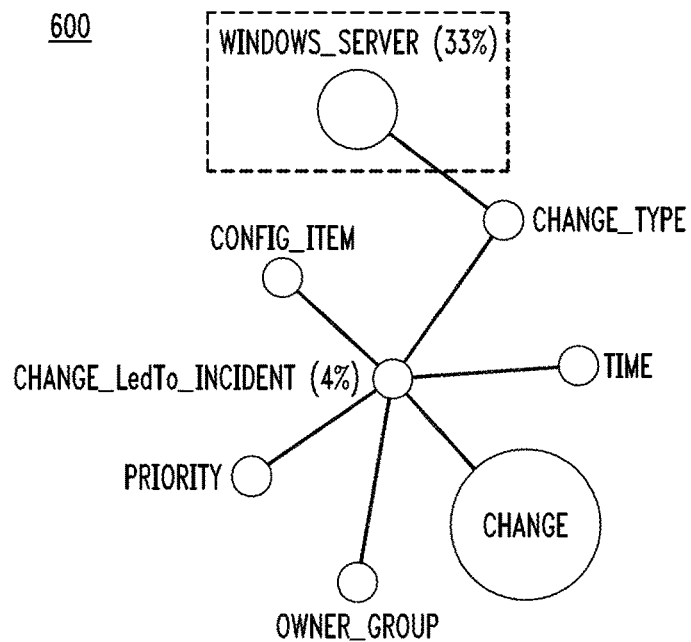

FIG. 5 shows probability tree 500, where the Change_LedTo_Incident node is expanded with attributes including Owner_Group, Priority, Config_Item, Change_Type and Time. Change_Type is the selected node in probability tree 500. In other embodiments, however, other dimensions or attributes may be selected. As shown in FIG. 6, the node "Windows_Server" under change type is selected for the probability tree 600 as the worst-performing change type.

Figure 7:
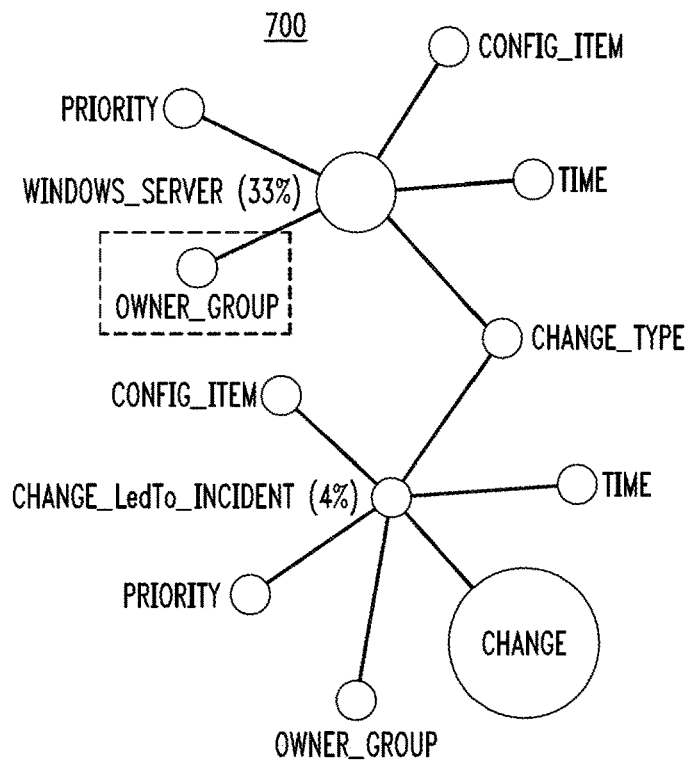
Figure 8:
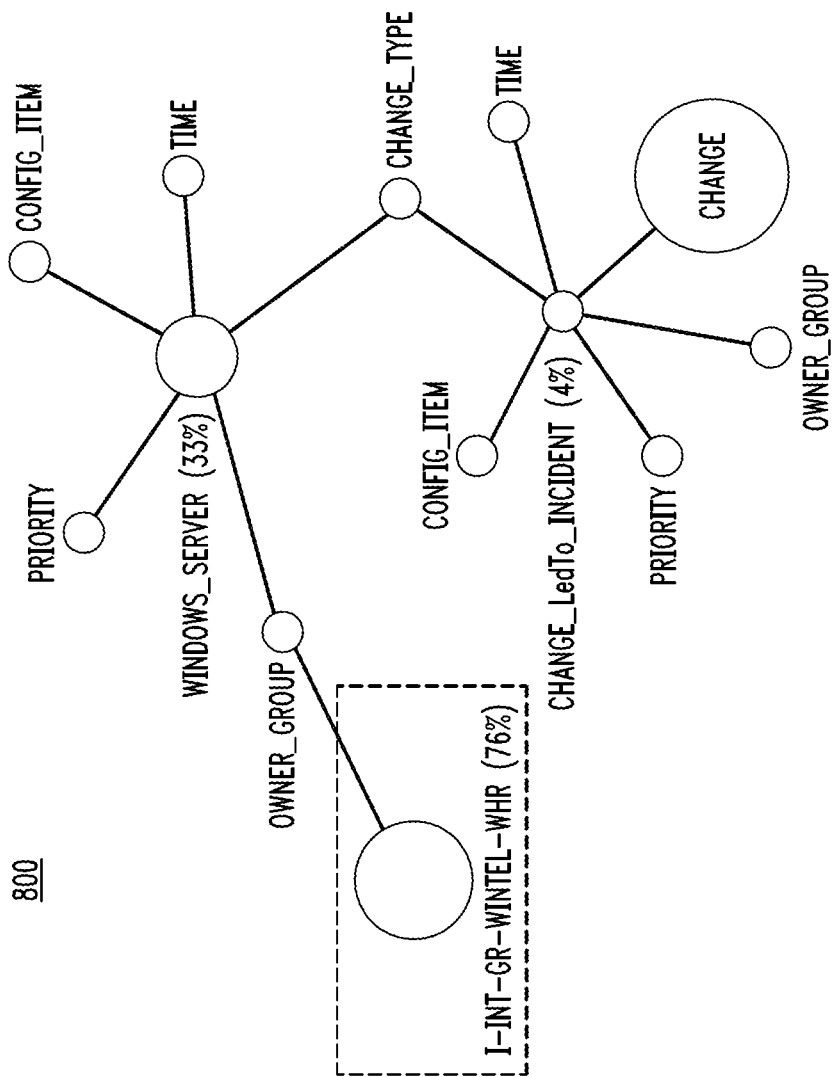

FIG. 7 shows probability tree 700, which expands the Windows Server node with the attributes Owner_Group, Priority, Config_Item and Time. The attribute Owner_Group is selected for probability tree 700, and the worst-performing owner group I-INT-GR-WINTEL-WHR is selected in the probability tree 800 shown in FIG. 8.

Figure 9:
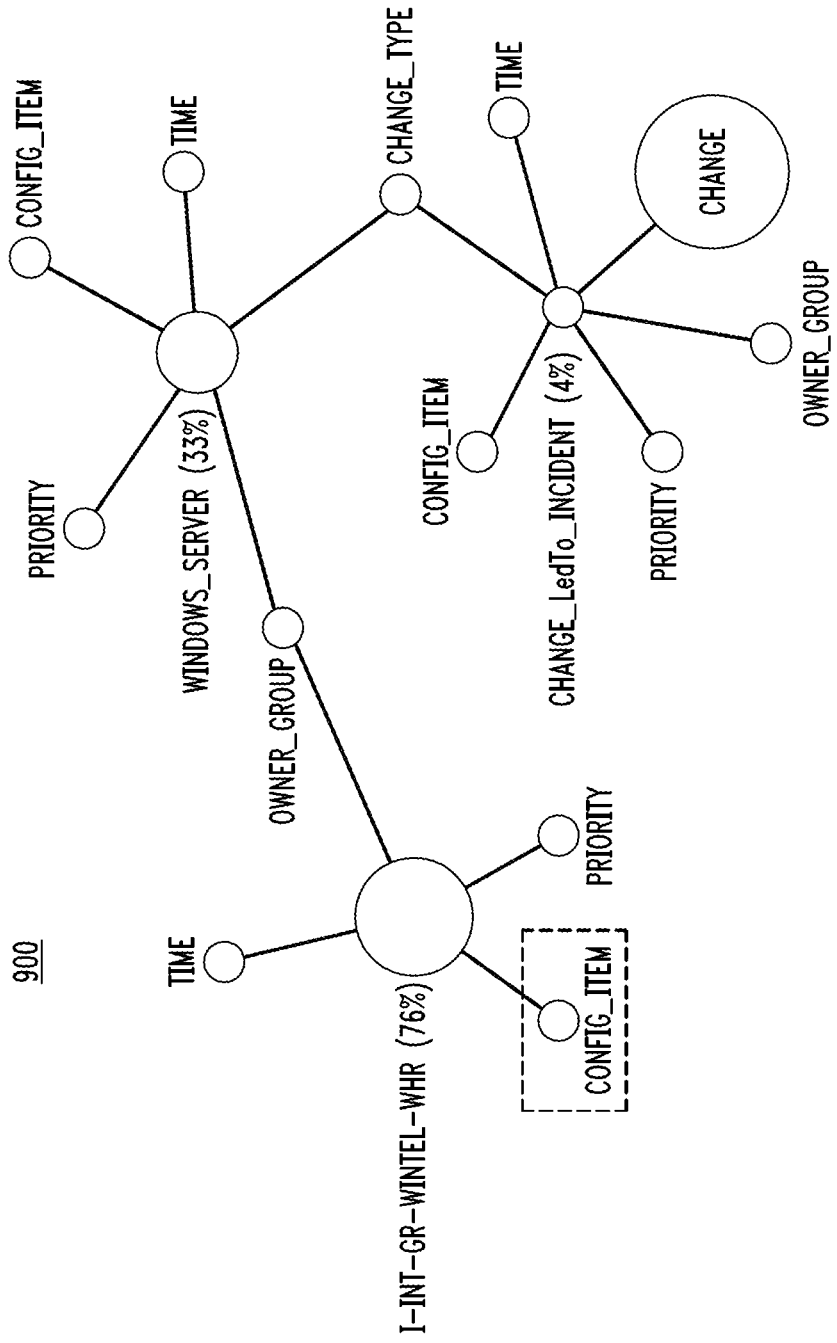
Figure 10:
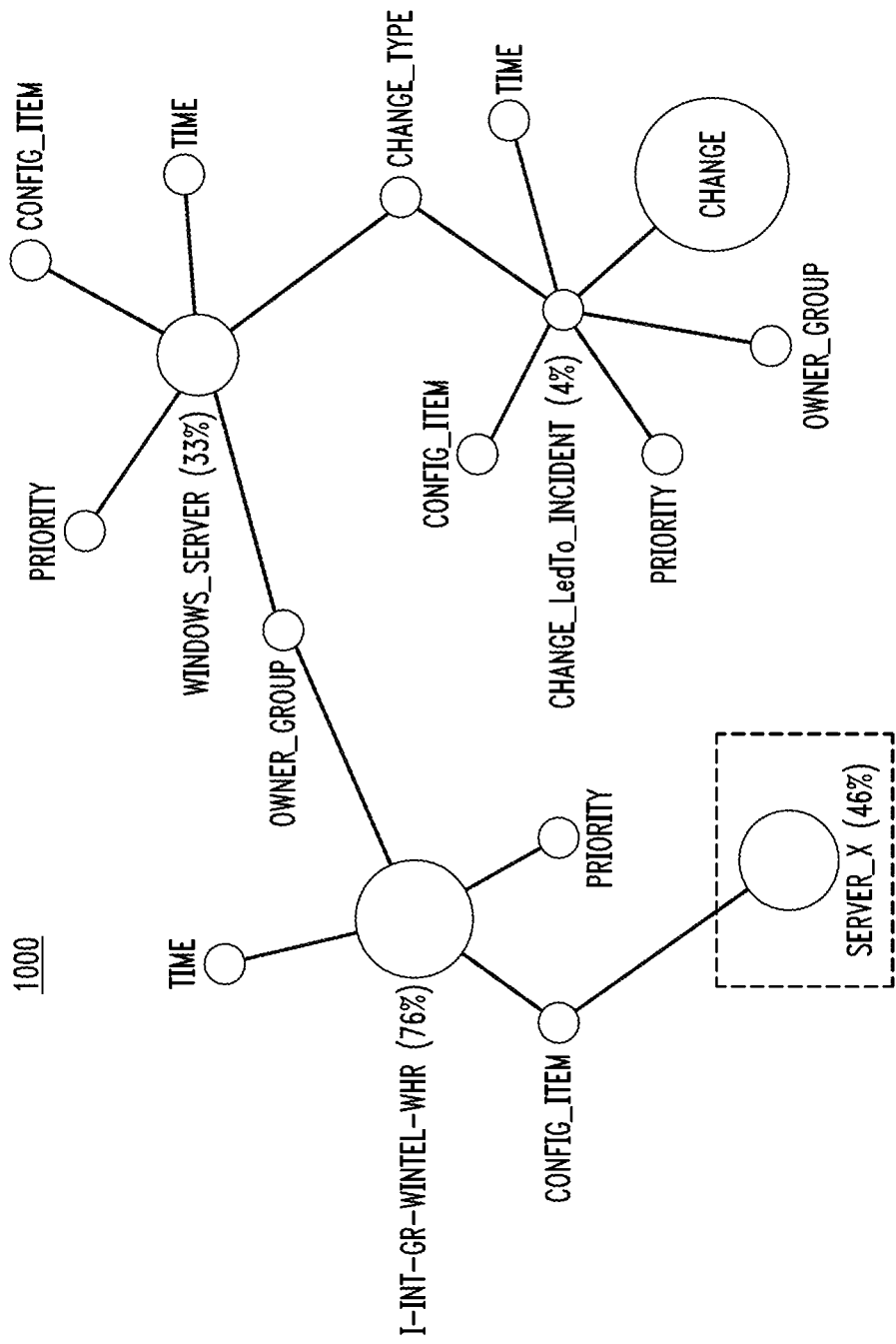

The I-INT-GR-WINTEL-WHR node in probability tree 900 is expanded with the attributes Time, Config_Item and Priority as shown in FIG. 9. The Config_Item attribute is selected and the worst-performing CI is expanded as shown in FIG. 10, where the node Server_X is selected.

Figure 11:
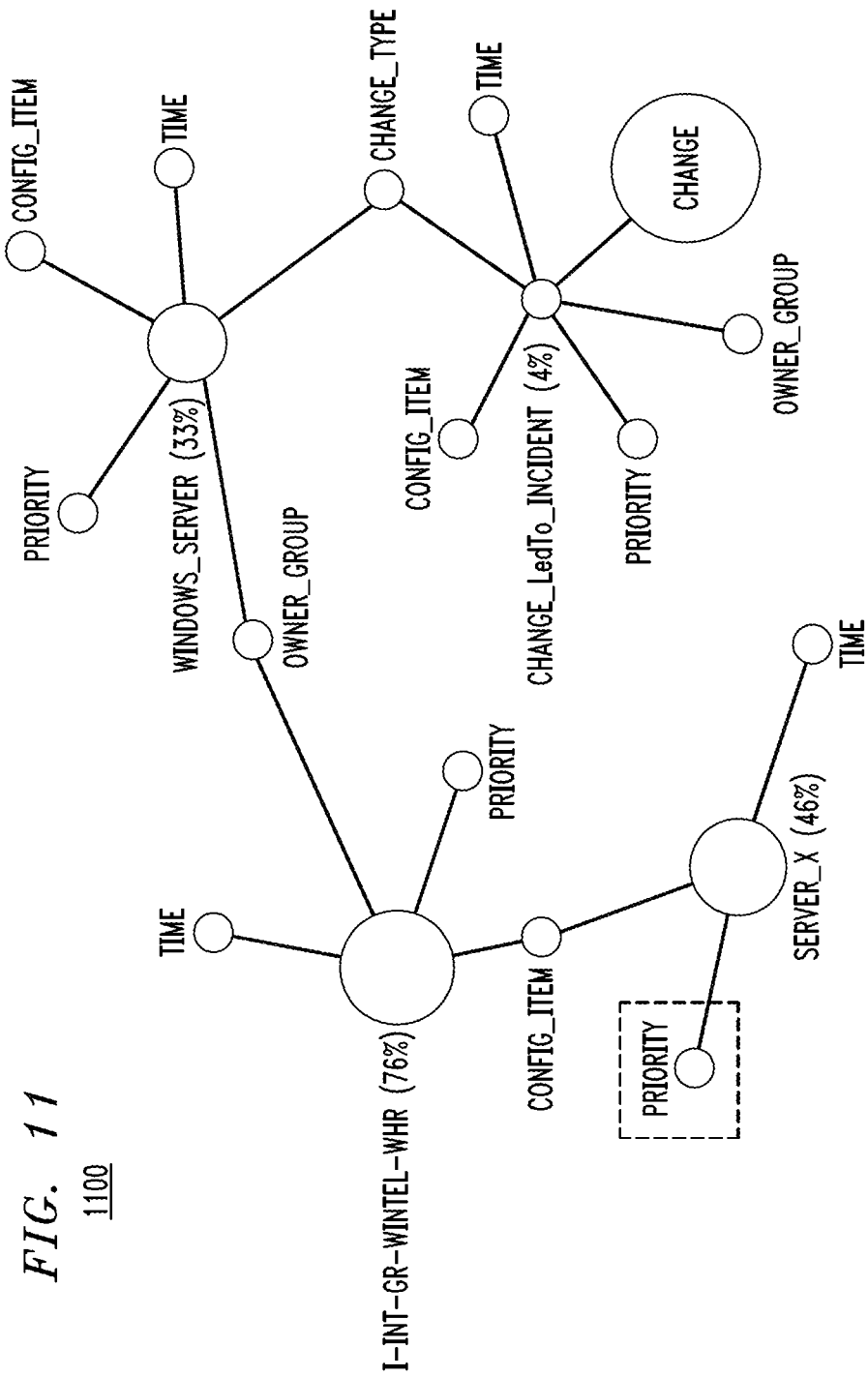
Figure 12:
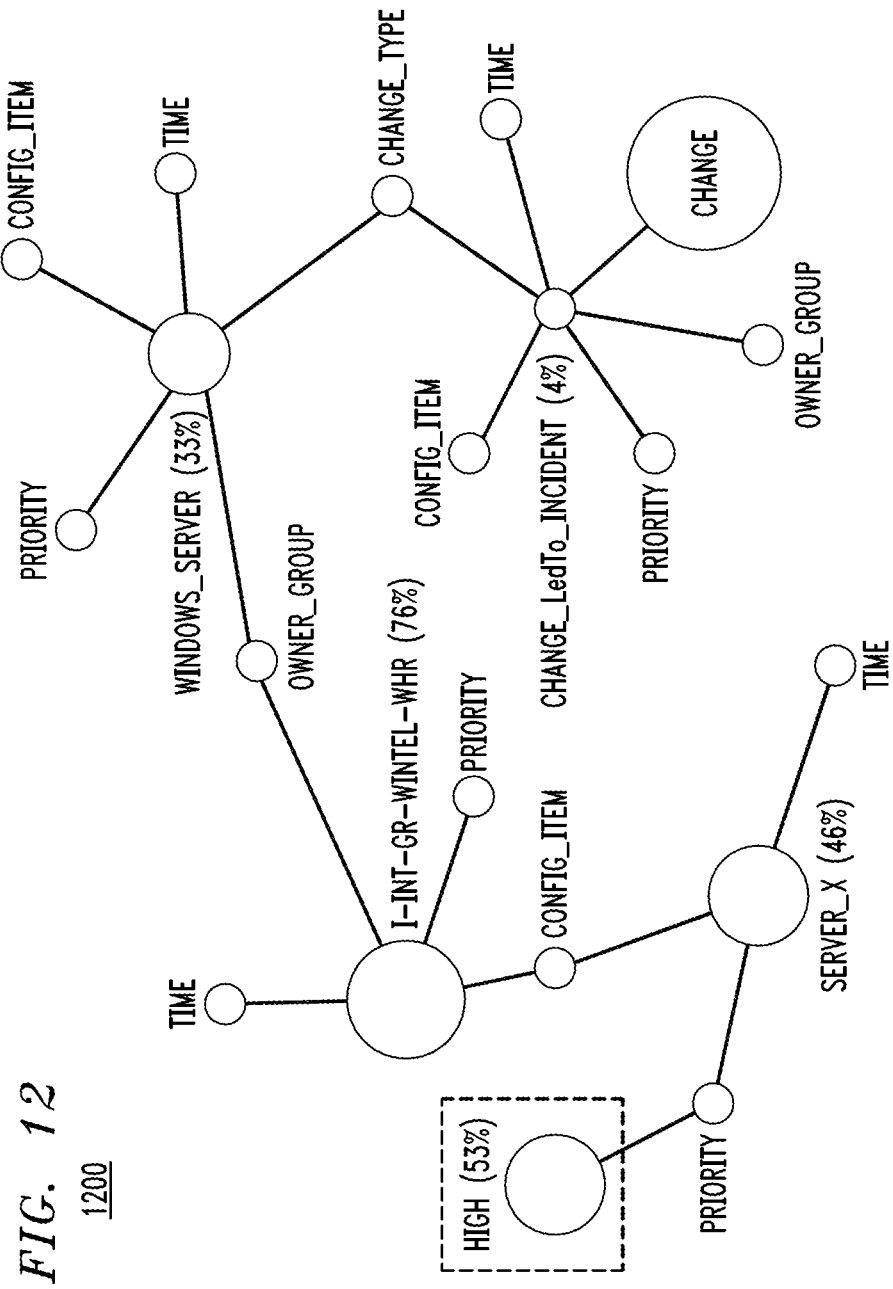
Figure 13:
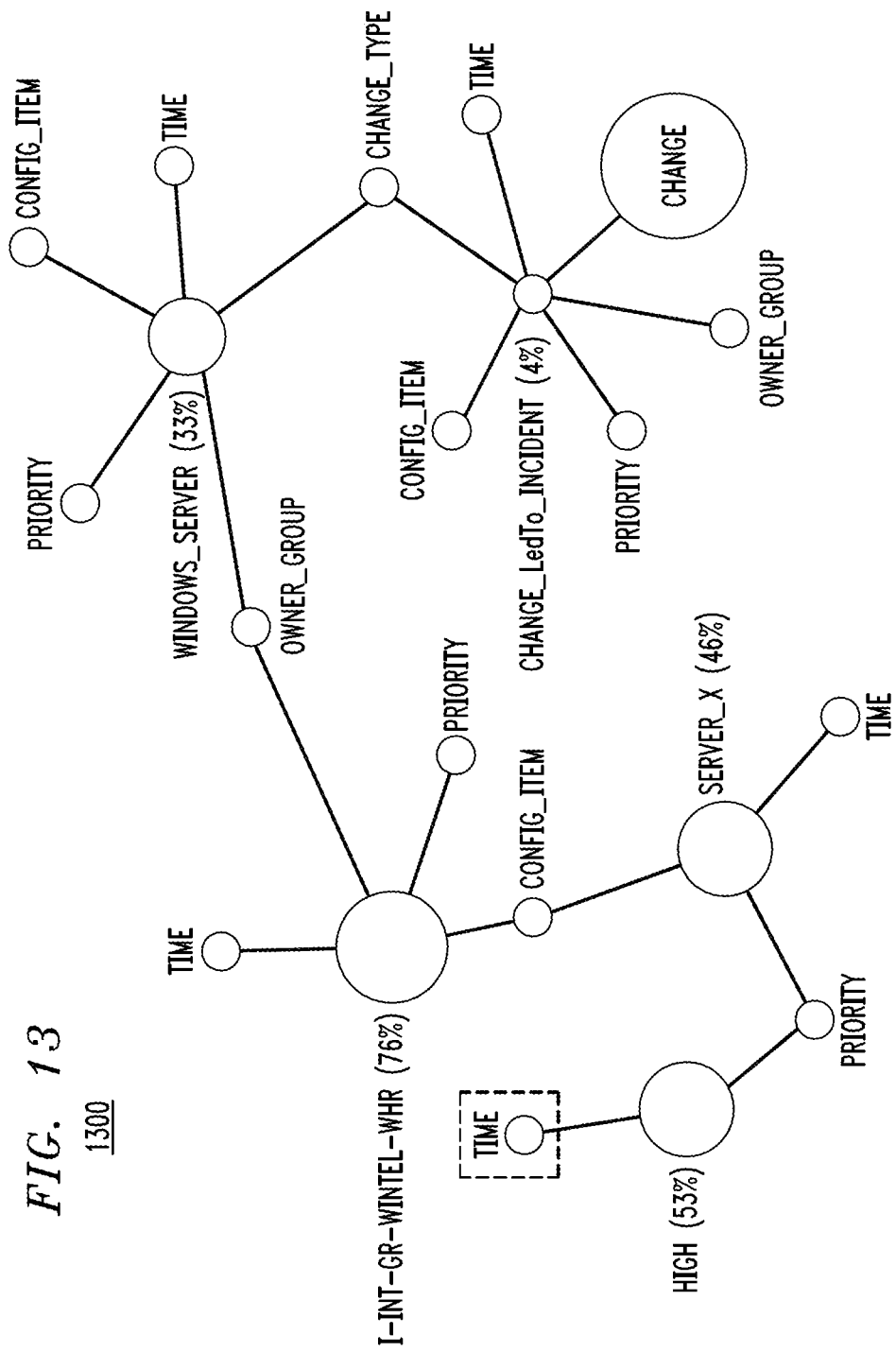

FIG. 11 shows probability tree 1100, which expands the Server_X node with the attributes of Time and Priority. The Priority attribute is selected as shown in FIG. 11. FIG. 12 shows probability tree 1200 including the worst-performing priority, High, for the Server_X node. Probability tree 1300 in FIG. 13 shows the High priority node expanded with the Time attribute being selected. It is again important to note that the probability trees shown in FIGS. 3-13 show just one example wherein the attributes or dimensions potentially affecting the outcome of a change are owner group, priority, CI, change type and time. Various other attributes or dimensions may be used in other embodiments.

Figure 14:
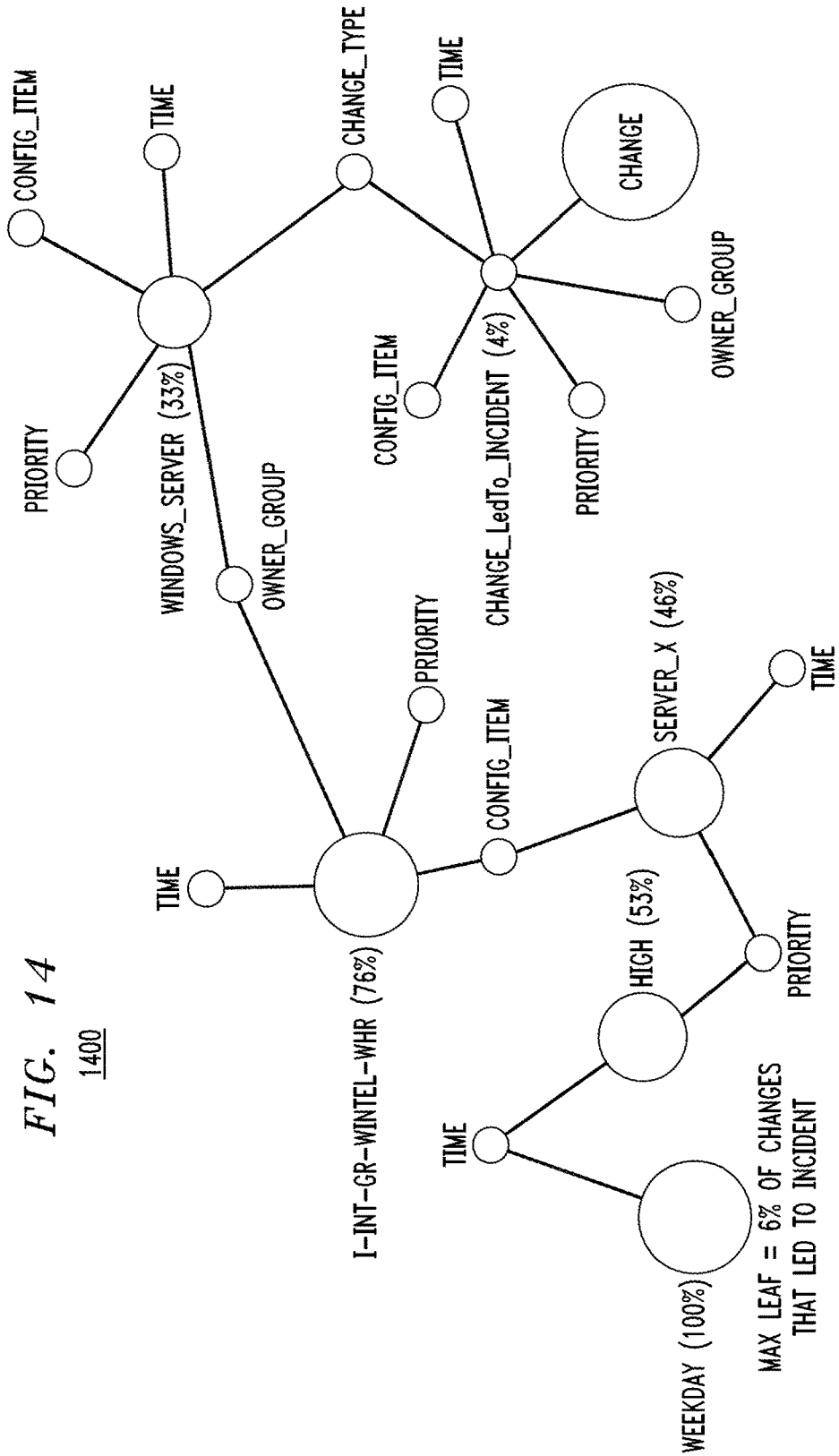
FIG. 14 depicts an observation, obtained from a probability tree, utilized for generating a recommendation for altering implementation of changes to configuration items in information technology infrastructure, according to an embodiment of the present invention.

FIG. 14 shows an example of an observation obtained from a probability tree 1400, where the observation may be used in generating a recommendation for altering the implementation of changes to CIs in IT infrastructure. The probability tree 1400 is expanded from probability tree 1300 to expand the time attribute with the maximum leaf of Weekday. In this particular example the maximum leaf or max leaf represents 6% of changes that led to an incident. The maximum leaf represents the combination of attributes or dimensions having the worst-performing outcome. In this particular example, the combination of attributes is Windows_Server change type, I-INT-GR-WINTEL-WHR owner group, Server_X configuration item, High priority and Weekday time. The resulting observation, as shown in FIG. 14, is that whenever a Windows_Server change is created for the owner group I-INT-GR-WINTEL, and it is for the CI Server_X, of High priority and scheduled on a weekday, there is a higher risk of causing an incident.

Action recommendation module 122 may utilize this observation, which may be received from change analysis module 120, to generate a recommendation. As discussed above, the recommendation corresponding to this observation is based on actions associated with the observed attributes (e.g., change type, owner group, CI, priority and time). Examples of such recommended actions include training personnel in the I-INT-GR-WINTEL owner group on how to perform changes in Windows servers, or discouraging or disallowing changes on weekdays.

In some embodiments, the action recommendation module 122 may compare the max leafs for both the positive and negative outcome branches of a probability tree so as to determine if the maximum leaf for the negative outcome is statistically significant.

Figure 15:
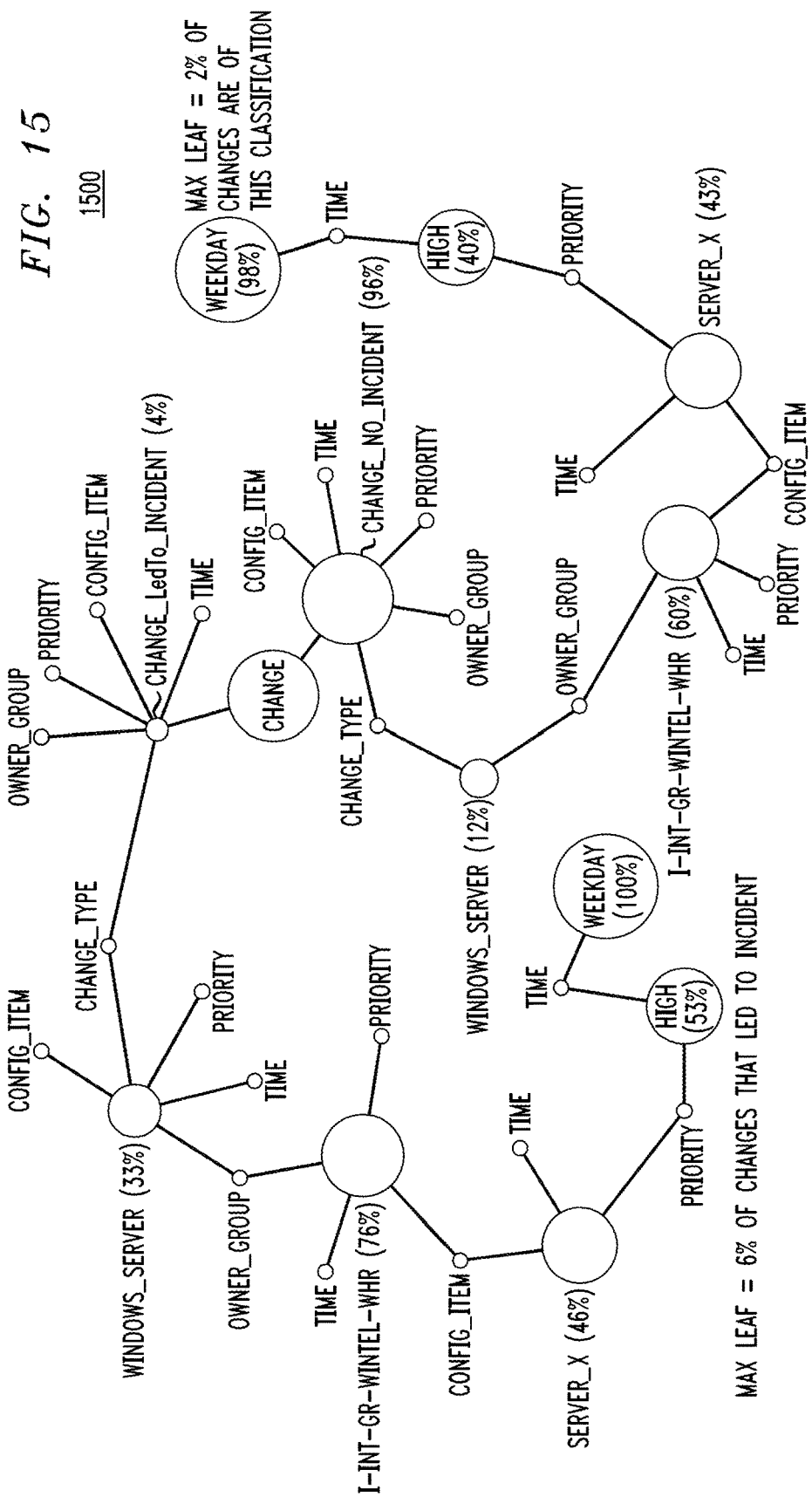
FIG. 15 depicts another observation, obtained from a probability tree, utilized for generating a recommendation for altering implementation of changes to configuration items in information technology infrastructure, according to an embodiment of the present invention.

FIG. 15 illustrates an observation obtained from comparing the maximum leaf in the Change_LedTo_Incident branch with a corresponding maximum leaf in the Change_No_Incident branch of probability tree 1500. The probability tree 1500 expands the root node Change on the Change_LedTo_Incident path described above to the maximum leaf for Weekday representing 6% of changes that led to incidents. The probability tree 1500 also expands to a corresponding maximum leaf on the Change_No_Incident path, which indicates that 2% of changes that did not lead to incidents are of the same classification, e.g., change type Windows_Server, owner group I-INT-WINTEL-WHR, CI Server_X, priority High and time Weekday. The maximum leaf on the negative outcome branch for changes that led to incidents is compared with the maximum leaf on the positive outcome branch for changes that did not lead to incidents to determine if the dimensions or attributes are statistically significant. As the maximum leaf percentage on the positive outcome is much higher than the maximum leaf percentage on the negative outcome, it is assumed that there is a statistically significant difference, and the action recommendation module 122 generates recommended actions based on the observation. Other methods, such as total ticket count, can also be used to determine significance (e.g., 2% of 1000 tickets is much smaller than 2% of 100,000 tickets).

Figure 16:
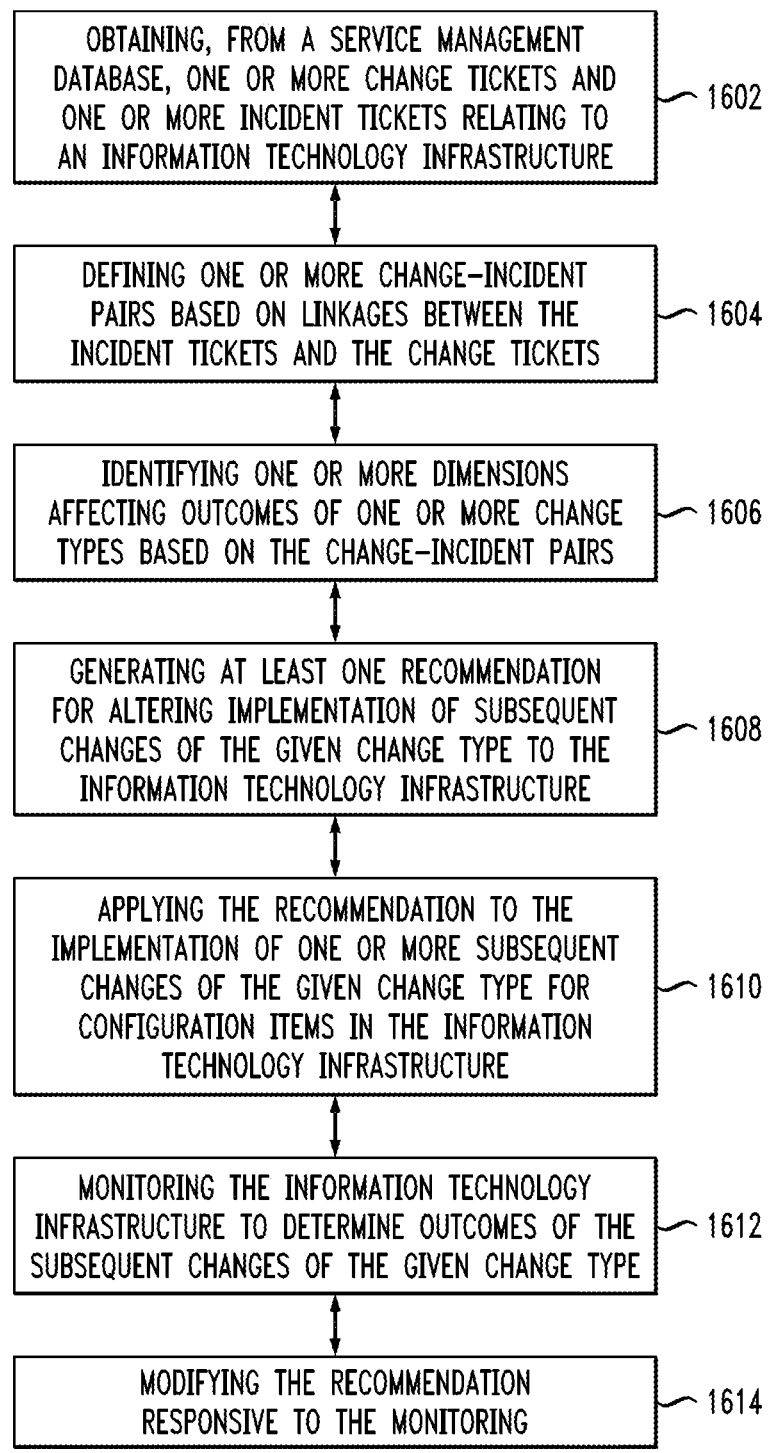
FIG. 16 depicts a process for implementing changes for configuration items in information technology infrastructure, according to an embodiment of the present invention.

FIG. 16 shows a process 1600 for implementing changes for CIs in IT infrastructure, such as IT infrastructure 106. The process 1600 may be performed by service management system 102 utilizing change analysis module 120, action recommendation module 122 and real-time monitoring module 124. Although the process 1600 is described below in the context of the FIG. 1 system, the process 1600 may be performed by other types of systems or devices in other embodiments.

The process 1600 begins with step 1602, obtaining one or more change tickets and one or more incident tickets relating to IT infrastructure 106 from SMDB 104. In step 1604, change-incident pairs are defined based on linkages between the incident tickets and the change tickets. Change-incident pairs is a term that should be construed broadly so as to encompass linkages between changes that led to incidents as well as changes that did not lead to incidents. Linkages between change and incident tickets may be discovered by change analysis module 120, or may be obtained from SMDB 104, CMDB 105 or some other source. Various techniques may be used to define linkages between change and incident tickets, or more generally between changes and incidents.

In some embodiments, defining linkages between changes and incidents may include extracting from the change tickets and incident tickets, or more generally change and incident data, dimensions that indicate potential causality between changes and incidents. CIs associated with the changes and incidents are identified, and then linkages are defined using the dimensions and identified CIs. The dimensions indicating potential causality between changes and incidents may be identified by analyzing various structured and unstructured fields of the change and incident tickets for a test data set with certain known change-incident pairs, including for changes that did not lead to incidents, are used as ground truths.

In step 1606, one or more dimensions affecting outcomes of one or more change types are identified from the change-incident pairs. In some embodiments, step 1606 utilizes probability trees and graph search algorithms as discussed above. For example, identifying the dimensions affecting outcomes of the one or more change types comprises dividing the data into two or more categories based on outcomes of historical changes to the IT infrastructure 106.

The two or more categories, in some embodiments, includes a first category associated with negative outcomes of historical changes to the IT infrastructure 106 and a second category associated with positive outcomes of historical changes to the IT infrastructure 106. As discussed above, however, each change or instance may be associated with an N-ary outcome where N is an integer greater than or equal to two. Thus, there may be more than two categories of changes. Positive and negative outcomes may be, by way of example, successful and failed changes, healthy and troubled CIs, changes that led to incidents and changes that did not lead to incidents, etc. In addition, various gradations may be used, such as successful, partially successful and unsuccessful, red, amber and green, etc.

Examples of the dimensions or attributes which may affect the outcomes include change types, owner group, time, priority, CI, risk, urgency, etc. Probability trees may be constructed for the different change types and other dimensions, where weights assigned to the different nodes or branches of the probability tree are learned through statistical methods including but not limited to KS statistics, and/or machine learning algorithms, including but not limited to regression models.

A weighted probability tree is generated for the historical changes, where the weighted probability tree has a number of levels including a first level based on the two or more categories and additional levels based on various dimensions associated with the historical changes. FIG. 15, discussed above, shows probability tree 1500 with a first level (the nodes Change_LedTo_Incident and Change_No_Incident) that are based on the categories of outcomes. Probability tree 1500 further shows additional levels for different dimensions, such as the additional levels for change type, owner, group, CI, priority and time.

To identify the dimensions affecting outcomes, the probability tree may be analyzed to find a path to a maximum leaf in one of the different categories. Continuing with the FIG. 15 example, the path to the maximum leaf in the Change_LedTo_Incident category, for negative outcomes, is identified. It is to be noted that embodiments need not necessarily find the path to the maximum leaf. In some embodiments, paths may be found to any leaf matching certain thresholds. For example, the path may be to a leaf representing a defined percentage of negative outcomes without necessarily being the path to the leaf representing the highest percentage of negative outcomes. As another example, the path may be to a leaf representing a defined threshold number of negative outcomes (e.g., at least 100 negative outcomes) rather than a defined threshold percentage (e.g., at least 5% of negative outcomes). The particular values of such thresholds may vary as desired for a particular implementation.

For clarity below, the path will be referred to in terms of the maximum leaf or max leaf although embodiments are not limited solely to finding paths to a maximum leaf as described above. After identifying a path to the maximum leaf in the first category of the weighted binary tree, a determination is made as to whether one or more dimensions of the maximum leaf are statistically significant. To do so, some embodiments compare the maximum leaf in the first category with a corresponding maximum leaf in the second category. Again, the probability tree 1500 in FIG. 15 illustrates this concept, showing the differences between the maximum leaf in the Change LedTo Incident path with the corresponding maximum leaf in the Change_No_Incident path. As discussed above, various techniques may be used to compare the two paths and determine statistical significance.

In step 1608, at least one recommendation for altering the implementation of subsequent changes of a given change type to the IT infrastructure 106 is generated. Step 1608, in certain embodiments, is performed responsive to identifying that there is a statistically significant difference between the maximum leaf in the first category and the maximum leaf in the second category of the weighted binary tree. In other embodiments, however, this comparison need not be performed. The recommendation may be generated based on the association of actions and dimensions described above.

The recommendation is applied to the implementation of subsequent changes of the given change type for CIs in the IT infrastructure 106 in step 1610. For example, the observation obtained from probability tree 1500 in FIG. 15 may be used to recommend that Windows server changes for owner group I-INT-GR-WINTEL for CI Server_X of High priority be implemented over the weekend rather than on a weekday. Thus, the service management system 102 may monitor the IT infrastructure 106, and intercept, modify or alter the timing for implementation of changes of this type. This may involve interacting with application programming interfaces (APIs) of different CIs of the IT infrastructure 106, or by filtering or requiring pre-approval by the service management system 102 before changes are applied to the IT infrastructure 106 by members of the owner group I-INT-GR-WINTEL.

In step 1612, the IT infrastructure 106 is monitored to determine the outcomes of the subsequent changes of the given change type. Monitoring the subsequent changes may include measuring changes in outcome for the given change type resulting from applying the recommendation in step 1610. In step 1614, the recommendation is modified responsive to the monitoring. In some embodiments, this is based on the measured change in outcome for the given change type. Measuring the changes in outcome may include checking whether a percentage of changes of the given change type having negative outcomes is reduced, or, conversely determining if the percentage of changes of the given change time having positive outcomes has increased.

In some embodiments, step 1614 involves dynamically updating paths of a weighted binary tree to take into account the one or more subsequent changes. The weighted binary tree may also be utilized in step 1612 in determining the outcomes of the subsequent changes. For example, an adjustment in a probability of the maximum leaf resulting from dynamically updating the weighted binary tree may be identified and used to measure change in outcome. The relative adjustments in the probabilities of different paths in the weighted binary tree may also be utilized for measuring change in outcome. For these techniques, dynamic time filtering, path regeneration and calculation of probabilities are utilized.

Once a recommendation is implemented or applied in step 1610, the result may be an improvement in outcomes, a deterioration in outcomes or no change in outcome. The service management system 102 may continuously monitor the IT infrastructure 106 via real-time monitoring module 124 so as to identify which recommendations lead to improvement in outcomes. Improvement may be determined in various ways.

In some embodiments, a recommendation that leads to a change in outcome may cause changes in different paths of a weighted binary tree. As an example, if applying a recommendation causes a given change type to be implemented on the weekend rather than on weekdays, the weekend path should be evaluated and compared to the weekday path. In other words, the relative adjustments in probabilities for the weekend and weekday paths for the given change type are used to identify or measure change in outcome.

In other embodiments, a recommendation that leads to a change in outcome may not alter the path for a given change type. As an example, if applying a recommendation results in training an owner group, this will not necessarily result in a change in the path for a given change type. To evaluate such a recommendation, the delta or change in probability for the path for the given change type before and after applying the recommendation is identified and used to measure change in outcome.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 17:
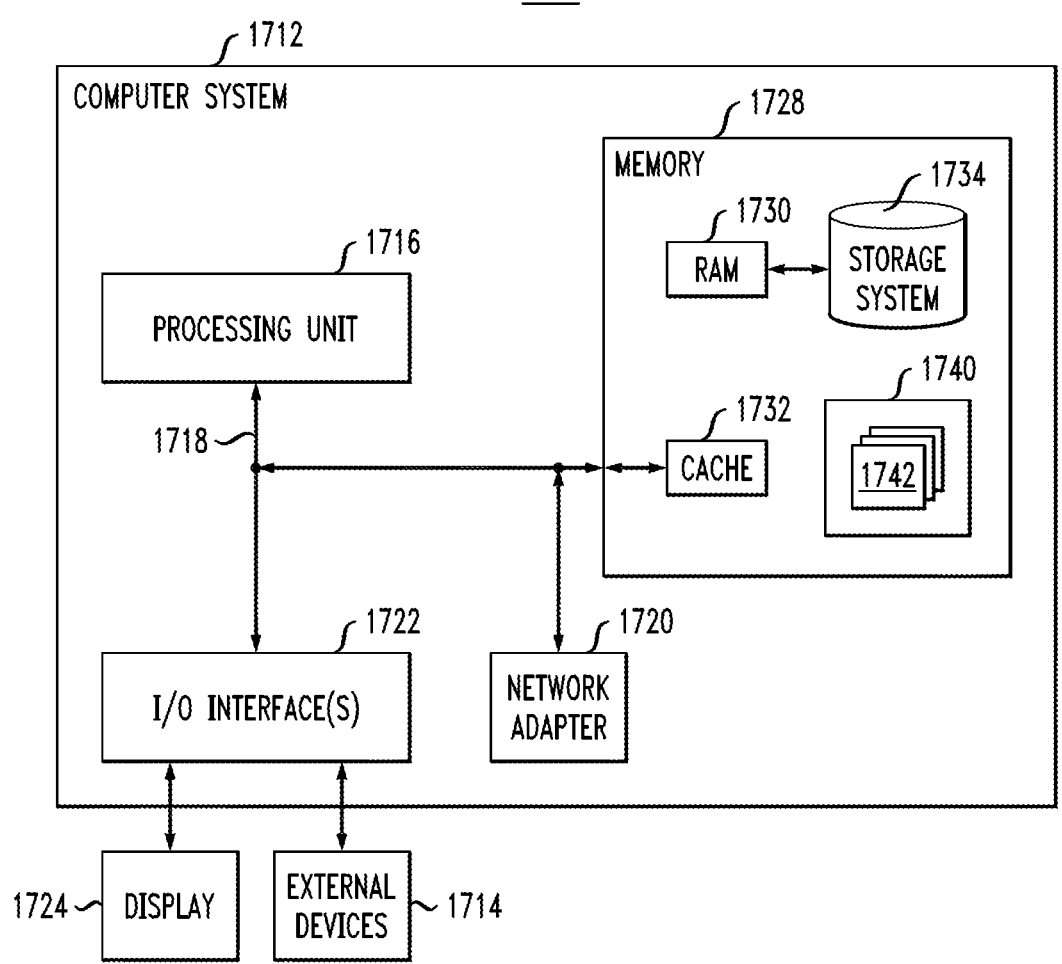
FIG. 17 depicts a computer system in accordance with which one or more components/steps of techniques of the invention may be implemented, according to an embodiment of the invention.

One or more embodiments can make use of software running on a general-purpose computer or workstation. With reference to FIG. 17, in a computing node 1710 there is a computer system/server 1712, which is operational with numerous other general purpose or special purpose computing system environments or configurations. Examples of well-known computing systems, environments, and/or configurations that may be suitable for use with computer system/server 1712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 1712 in computing node 1710 is shown in the form of a general-purpose computing device. The components of computer system/server 1712 may include, but are not limited to, one or more processors or processing units 1716, a system memory 1728, and a bus 1718 that couples various system components including system memory 1728 to processor 1716.

The bus 1718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1712 typically includes a variety of computer system readable media. Such media may be any available media that is accessible by computer system/server 1712, and it includes both volatile and non-volatile media, removable and non-removable media.

The system memory 1728 can include computer system readable media in the form of volatile memory, such as random access memory (RAM) 1730 and/or cache memory 1732. The computer system/server 1712 may further include other removable/non-removable, volatile/nonvolatile computer system storage media. By way of example only, storage system 1734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1718 by one or more data media interfaces. As depicted and described herein, the memory 1728 may include at least one program product having a set (e.g., at least one) of program modules that are configured to carry out the functions of embodiments of the invention. A program/utility 1740, having a set (at least one) of program modules 1742, may be stored in memory 1728 by way of example, and not limitation, as well as an operating system, one or more application programs, other program modules, and program data. Each of the operating system, one or more application programs, other program modules, and program data or some combination thereof, may include an implementation of a networking environment. Program modules 1742 generally carry out the functions and/or methodologies of embodiments of the invention as described herein.

Computer system/server 1712 may also communicate with one or more external devices 1714 such as a keyboard, a pointing device, a display 1724, etc., one or more devices that enable a user to interact with computer system/server 1712, and/or any devices (e.g., network card, modem, etc.) that enable computer system/server 1712 to communicate with one or more other computing devices. Such communication can occur via I/O interfaces 1722. Still yet, computer system/server 1712 can communicate with one or more networks such as a LAN, a general WAN, and/or a public network (e.g., the Internet) via network adapter 1720. As depicted, network adapter 1720 communicates with the other components of computer system/server 1712 via bus 1718. It should be understood that although not shown, other hardware and/or software components could be used in conjunction with computer system/server 1712. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
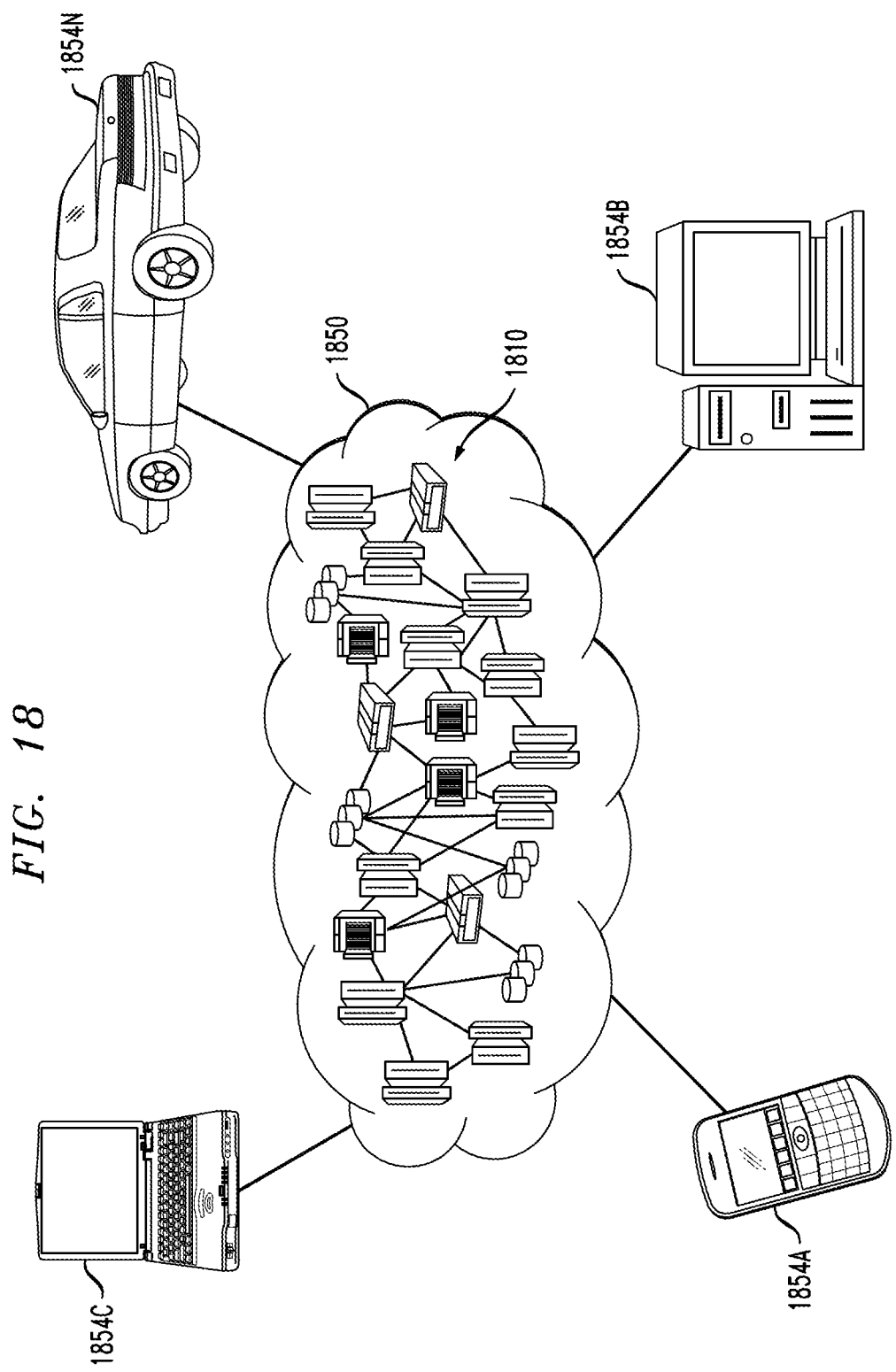
FIG. 18 depicts a cloud computing environment, according to an embodiment of the present invention.

Referring now to FIG. 18, illustrative cloud computing environment 1850 is depicted. As shown, cloud computing environment 1850 includes one or more cloud computing nodes 1810 with which local computing devices used by cloud consumers, such as, for example, personal digital assistant (PDA) or cellular telephone 1854A, desktop computer 1854B, laptop computer 1854C, and/or automobile computer system 1854N may communicate. Nodes 1810 may communicate with one another. They may be grouped (not shown) physically or virtually, in one or more networks, such as Private, Community, Public, or Hybrid clouds as described hereinabove, or a combination thereof. This allows cloud computing environment 1850 to offer infrastructure, platforms and/or software as services for which a cloud consumer does not need to maintain resources on a local computing device. It is understood that the types of computing devices 1854A-N shown in FIG. 18 are intended to be illustrative only and that computing nodes 1810 and cloud computing environment 1850 can communicate with any type of computerized device over any type of network and/or network addressable connection (e.g., using a web browser).

Figure 19:
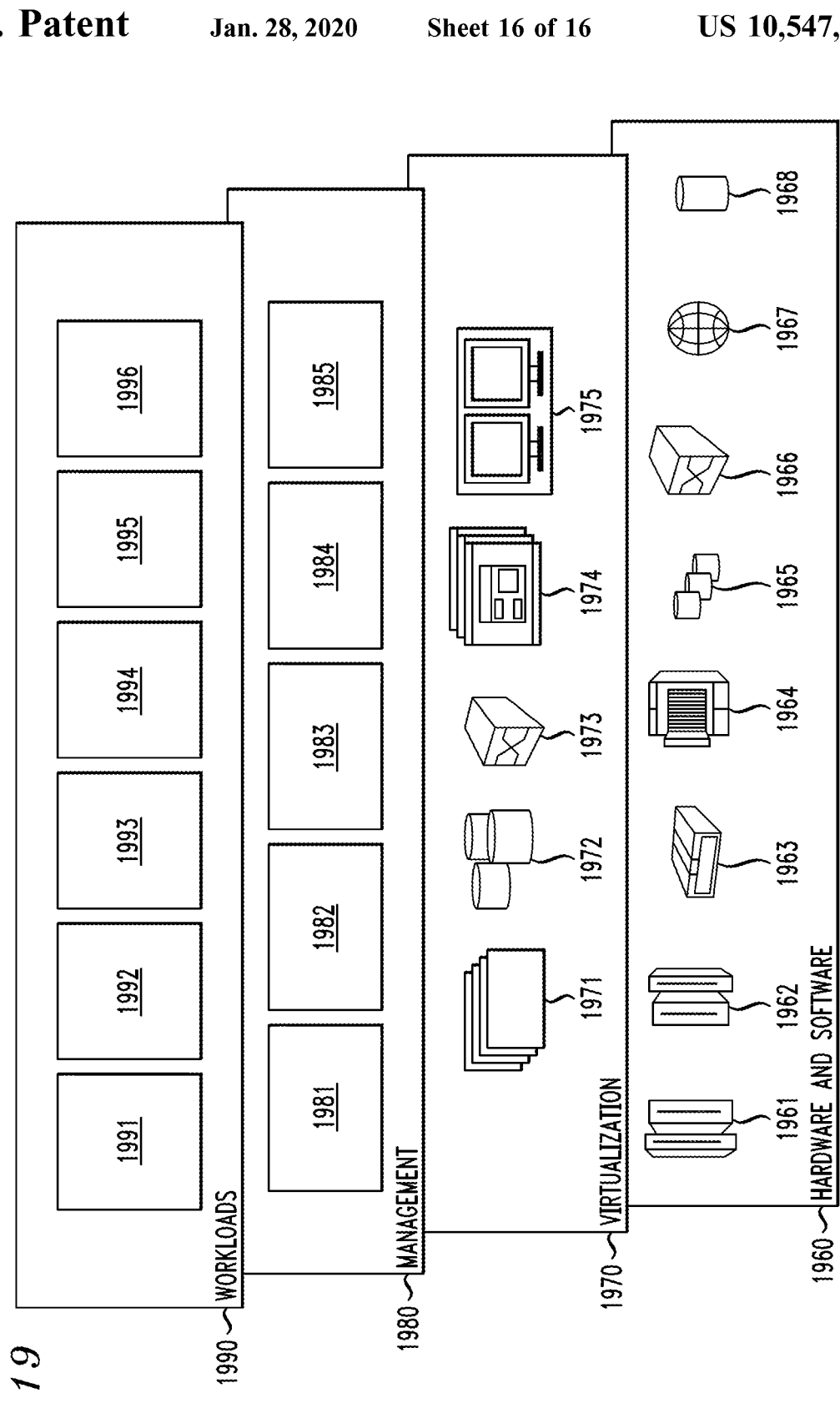
FIG. 19 depicts abstraction model layers, according to an embodiment of the present invention.

Referring now to FIG. 19, a set of functional abstraction layers provided by cloud computing environment 1850 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 1960 includes hardware and software components. Examples of hardware components include: mainframes 1961; RISC (Reduced Instruction Set Computer) architecture based servers 1962; servers 1963; blade servers 1964; storage devices 1965; and networks and networking components 1966. In some embodiments, software components include network application server software 1967 and database software 1968.

Virtualization layer 1970 provides an abstraction layer from which the following examples of virtual entities may be provided: virtual servers 1971; virtual storage 1972; virtual networks 1973, including virtual private networks; virtual applications and operating systems 1974; and virtual clients 1975.

In one example, management layer 1980 may provide the functions described below. Resource provisioning 1981 provides dynamic procurement of computing resources and other resources that are utilized to perform tasks within the cloud computing environment. Metering and Pricing 1982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1983 provides access to the cloud computing environment for consumers and system administrators. Service level management 1984 provides cloud computing resource allocation and management such that required service levels are met. Service Level Agreement (SLA) planning and fulfillment 1985 provide pre-arrangement for, and procurement of, cloud computing resources for which a future requirement is anticipated in accordance with an SLA.

Workloads layer 1990 provides examples of functionality for which the cloud computing environment may be utilized. Examples of workloads and functions which may be provided from this layer include: mapping and navigation 1991; software development and lifecycle management 1992; virtual classroom education delivery 1993; data analytics processing 1994; transaction processing 1995; and change implementation and monitoring 1996, which may perform various functions described above with respect to service management system 102.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
obtaining, from a service management database, one or more change tickets and one or more incident tickets relating to an information technology infrastructure;
defining one or more change-incident pairs based on linkages between the incident tickets and the change tickets;
identifying one or more dimensions affecting outcomes of implementation of one or more change types based on the change-incident pairs utilizing a probability tree classifying historical changes to the information technology infrastructure based on: on outcomes of the historical changes to the information technology infrastructure; and the one or more dimensions;
generating at least one recommendation for altering implementation of subsequent changes of a given change type to the information technology infrastructure based on the identified dimensions;
applying said at least one recommendation to the implementation of one or more subsequent changes of the given change type to configuration items in the information technology infrastructure;
monitoring the information technology infrastructure to determine outcomes of the subsequent changes of the given change type; and
modifying said at least one recommendation responsive to said monitoring;
wherein identifying a given one of the one or more dimensions affecting outcomes of implementation of one or more change types based on the change-incident pairs utilizing the probability tree comprises determining a difference between (i) a first weighting of a first leaf of the probability tree corresponding to negative outcome for one or more changes with a given set of the one or more dimensions and (ii) a second weighting of a second leaf of the probability tree corresponding to a positive outcome for one or more changes with the given set of the one or more dimensions; and
wherein the method is performed by at least one processing device coupled to the information technology infrastructure over at least one network.

2. The method of claim 1 wherein the configuration items in the information technology infrastructure comprises one or more servers, databases, middleware, software and business applications.

3. The method of claim 1 wherein monitoring the subsequent changes comprises measuring changes in outcome for the given change type resulting from applying said at least one recommendation.

4. The method of claim 3 wherein modifying said at least one recommendation is based on the measured changes in outcome for the given change type.

5. The method of claim 3 wherein measuring changes in outcome for the given change type comprises checking whether a percentage of changes of the given change type having negative outcomes is reduced.

6. The method of claim 1 wherein identifying the one or more dimensions affecting outcomes of the one or more change types comprises dividing the data into two or more categories based on the outcomes of the historical changes to the information technology infrastructure.

7. The method of claim 6 wherein the two or more categories comprise a first category associated with negative outcomes of the historical changes to the information technology infrastructure and a second category associated with positive outcomes of the historical changes to the information technology infrastructure.

8. The method of claim 7 wherein each of the historical changes is associated with a plurality of dimensions, the plurality of dimensions comprising two or more of: a change type, an owner group, a time, a priority, a configuration item, a risk and an urgency.

9. A computer program product comprising a computer readable storage medium for storing computer readable program code which, when executed, causes a computer:
to obtain, from a service management database, one or more change tickets and one or more incident tickets relating to an information technology infrastructure;
to define one or more change-incident pairs based on linkages between the incident tickets and the change tickets;
to identify one or more dimensions affecting outcomes of implementation of one or more change types based on the change-incident pairs utilizing a probability tree classifying historical changes to the information technology infrastructure based on: on outcomes of the historical changes to the information technology infrastructure; and the one or more dimensions;
to generate at least one recommendation for altering implementation of subsequent changes of a given change type to the information technology infrastructure based on the identified dimensions;
to apply said at least one recommendation to the implementation of one or more subsequent changes of the given change type to configuration items in the information technology infrastructure;
to monitor the information technology infrastructure to determine outcomes of the subsequent changes of the given change type; and
to modify said at least one recommendation responsive to said monitoring;
wherein identifying a given one of the one or more dimensions affecting outcomes of implementation of one or more change types based on the change-incident pairs utilizing the probability tree comprises determining a difference between (i) a first weighting of a first leaf of the probability tree corresponding to negative outcome for one or more changes with a given set of the one or more dimensions and (ii) a second weighting of a second leaf of the probability tree corresponding to a positive outcome for one or more changes with the given set of the one or more dimensions; and wherein the computer is coupled to the information technology infrastructure over at least one network.

10. The computer program product of claim 9 wherein the configuration items in the information technology infrastructure comprises one or more servers, databases, middleware, software and business applications.

11. The computer program product of claim 9 wherein monitoring the subsequent changes comprises measuring changes in outcome for the given change type resulting from applying said at least one recommendation.

12. The computer program product of claim 11 wherein modifying said at least one recommendation is based on the measured changes in outcome for the given change type.

13. The computer program product of claim 11 wherein measuring changes in outcome for the given change type comprises checking whether a percentage of changes of the given change type having negative outcomes is reduced.

14. The computer program product of claim 9 wherein identifying the one or more dimensions affecting outcomes of the one or more change types comprises dividing the data into two or more categories based on the outcomes of the historical changes to the information technology infrastructure.

15. The computer program product of claim 14 wherein the two or more categories comprise a first category associated with negative outcomes of the historical changes to the information technology infrastructure and a second category associated with positive outcomes of the historical changes to the information technology infrastructure.

16. The computer program product of claim 15 wherein each of the historical changes is associated with a plurality of dimensions, the plurality of dimensions comprising two or more of: a change type, an owner group, a time, a priority, a configuration item, a risk and an urgency.

17. An apparatus comprising:
a processing device comprising a processor coupled to a memory;
the processing device being configured:
to obtain, from a service management database, one or more change tickets and one or more incident tickets relating to an information technology infrastructure;
to define one or more change-incident pairs based on linkages between the incident tickets and the change tickets;
to identify one or more dimensions affecting outcomes of implementation of one or more change types based on the change-incident pairs utilizing a probability tree classifying historical changes to the information technology infrastructure based on: on outcomes of the historical changes to the information technology infrastructure; and the one or more dimensions;
to generate at least one recommendation for altering implementation of subsequent changes of a given change type to the information technology infrastructure based on the identified dimensions;
to apply said at least one recommendation to the implementation of one or more subsequent changes of the given change type to configuration items in the information technology infrastructure;
to monitor the information technology infrastructure to determine outcomes of the subsequent changes of the given change type; and
to modify said at least one recommendation responsive to said monitoring;
wherein identifying a given one of the one or more dimensions affecting outcomes of implementation of one or more change types based on the change-incident pairs utilizing the probability tree comprises determining a difference between (i) a first weighting of a first leaf of the probability tree corresponding to negative outcome for one or more changes with a given set of the one or more dimensions and (ii) a second weighting of a second leaf of the probability tree corresponding to a positive outcome for one or more changes with the given set of the one or more dimensions; and
wherein the processing device is coupled to the information technology infrastructure over at least one network.

18. The apparatus of claim 17 wherein the configuration items in the information technology infrastructure comprises one or more servers, databases, middleware, software and business applications.

19. The apparatus of claim 17 wherein monitoring the subsequent changes comprises measuring changes in outcome for the given change type resulting from applying said at least one recommendation.

20. The apparatus of claim 17 wherein identifying the one or more dimensions affecting outcomes of the one or more change types comprises dividing the data into two or more categories based on the outcomes of the historical changes to the information technology infrastructure.

* * * * *